US010984969B1

(12) United States Patent
Wang et al.

(10) Patent No.: US 10,984,969 B1
(45) Date of Patent: Apr. 20, 2021

(54) UNIFORM ILLUMINATION OF KEYS ON A FLEXIBLE SUBSTRATE

(71) Applicant: Apple Inc., Cupertino, CA (US)

(72) Inventors: Paul X. Wang, Cupertino, CA (US); Aidan N. Zimmerman, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 376 days.

(21) Appl. No.: 16/032,876

(22) Filed: Jul. 11, 2018

Related U.S. Application Data

(60) Provisional application No. 62/531,600, filed on Jul. 12, 2017.

(51) Int. Cl.
H01H 13/83 (2006.01)
H01H 3/12 (2006.01)
G06F 3/02 (2006.01)
G06F 1/16 (2006.01)
H01H 3/00 (2006.01)

(52) U.S. Cl.
CPC .......... H01H 13/83 (2013.01); G06F 1/1662 (2013.01); G06F 3/0202 (2013.01); H01H 3/125 (2013.01); H01H 2003/007 (2013.01); H01H 2219/036 (2013.01); H01H 2219/06 (2013.01)

(58) Field of Classification Search
CPC ...... H01H 13/83; H01H 3/125; G06F 3/0202; G06F 1/1662
See application file for complete search history.

(56) References Cited

U.S. PATENT DOCUMENTS

2008/0088600 A1* 4/2008 Prest ................... H01H 25/041
345/173
2017/0160831 A1* 6/2017 Hanumanthaiah ..........................
H03K 17/9622
2018/0018023 A1* 1/2018 Nakamura ............. B60K 35/00

* cited by examiner

Primary Examiner — Thomas M Sember
(74) Attorney, Agent, or Firm — Dorsey & Whitney LLP

(57) ABSTRACT

Systems and methods for providing illumination to illuminable portions of keys associated with a keyboard are described. A key disposed on a flexible substrate includes a light guide positioned below a keycap. The light guide includes one or more light extraction features to produce a substantially uniform light distribution of light from a light emitting element at an illuminable portion of the key. In one embodiment, a light emitting element is positioned on the flexible substrate and is optically coupled to the light guide. In another embodiment, a light emitting element is positioned below the flexible substrate and is optically coupled to the light guide via an optical interface.

17 Claims, 20 Drawing Sheets

UNIFORM ILLUMINATION OF KEYS ON A FLEXIBLE SUBSTRATE

CROSS-REFERENCE TO RELATED APPLICATION

This claims priority to U.S. Provisional Patent Application No. 62/531,600, filed 12 Jul. 2017 and entitled, "UNIFORM ILLUMINATION OF KEYS ON A FLEXIBLE SUBSTRATE," and the entire disclosure of which is hereby incorporated by reference.

FIELD

Embodiments described herein are directed to input devices for computing systems and, more particularly, to systems and methods for facilitating substantially uniform illumination of select features of such input devices.

BACKGROUND

Electronic devices can receive user input from a keyboard, some keys of which may be illuminable and thus visible to a user in dimly-lit environments. Using some traditional techniques, it may be difficult to produce a uniform or consistent illumination for symbols or glyphs, which may vary in size and shape for different keys. Furthermore, uniform illumination may be further complicated by the presence of various components within the keyboard including, key mechanisms, key webs, and other structural components. The embodiments described herein may be used to improve to quality and uniformity of illuminated keys for a keyboard.

SUMMARY

Certain embodiments described herein relate to, include, or take the form of an electronic device including a keyboard. The keyboard includes a flexible substrate having a conductive trace. The keyboard further includes a light emitting element on the flexible substrate and electrically coupled to the conductive trace. The keyboard further includes a set of keys. Each key includes a keycap positioned over the flexible substrate and having an illuminable portion defining a symbol. Each key further includes a light guide positioned between the keycap and the flexible substrate and configured to optically couple light from the light emitting element to the illuminable portion of the keycap. Each key further includes a switch assembly positioned below the flexible substrate.

Other embodiments described generally reference a keyboard that includes a flexible substrate. The keyboard further includes a set of keycaps positioned over the flexible substrate, each keycap of the set of keycaps comprising a translucent portion and configured to depress in response to a press. The keyboard further includes a set of light guides, each light guide of the set of light guides positioned above the flexible substrate and below a respective keycap of the set of keycaps. The keyboard further includes a set of light emitting elements, each light emitting element of the set of light emitting elements optically coupled to a respective light guide of the set of light guides. The keyboard further includes a set of switch assemblies positioned below the flexible substrate. Each switch assembly of the set of switch assemblies includes a key mechanism configured to upwardly bias a corresponding keycap of the set of keycaps and a switch configured to actuate in response to the corresponding keycap being depressed. A movable portion of the flexible substrate associated with the corresponding keycap is configured to move in response to the keycap being depressed.

Still further embodiments described herein generally reference an electronic device including a flexible substrate and a light emitting element positioned below the flexible substrate. The electronic device further includes a keycap positioned above the flexible substrate and defining an illuminable symbol. The electronic device further includes a light guide positioned between the flexible substrate and the keycap. The light guide is configured to receive light from the light emitting element to produce a substantially uniform distribution of light along a bottom surface of the keycap.

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
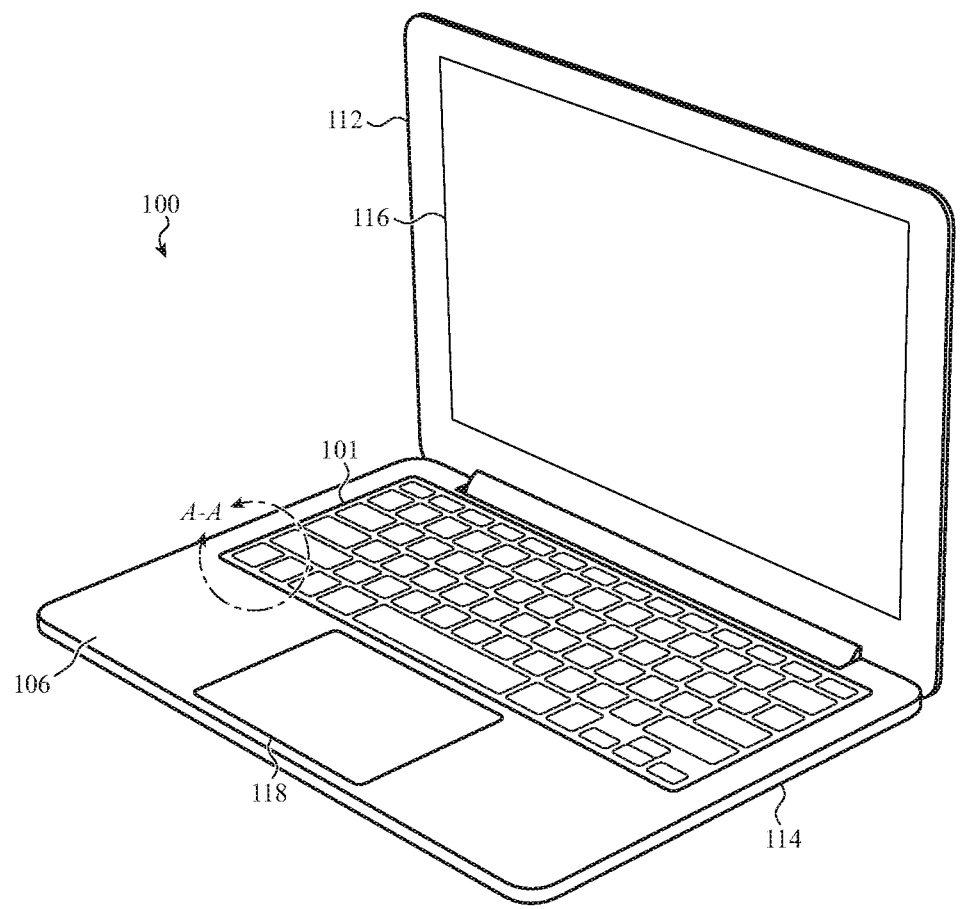
FIG. 1A depicts an electronic device incorporating a keyboard with illuminable keys, according to an embodiment.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments described herein are directed to systems and techniques for improving the uniformity of illumination of illuminated keys of a keyboard. In particular, the embodiments are directed to keys having a light guide positioned below a keycap. The light guide may include features for producing a uniform backlight for the keycap of the key. The optical features of the light guide may be tailored to produce a desired light effect or distribution for a specific key symbol or glyph. The optical features may also be optimized to provide substantially uniform distribution of light so that a variety of symbols or glyphs produce a consistent and uniform level of illumination.

Some embodiments described herein are directed to a keyboard having a flexible substrate or membrane that may provide a protective covering for the internal components of a keyboard or electronic device having a keyboard. The flexible substrate or membrane may include a cloth, fabric, or other pliable material that provides a barrier to contaminants and may also improve the visual appearance and tactile quality of the keyboard or device. In various embodiments, the flexible substrate is configured to move in response to the keycap being depressed, for example in response to a press.

As described in more detail here, the light guide may be positioned between the keycap and the flexible substrate or membrane to more efficiently couple or transmit light to the keycap. A light-emitting diode (LED) may be positioned between the keycap and the flexible substrate and may be powered using conductive traces or elements integrated with the flexible substrate. In some embodiments, the LED is positioned below the flexible substrate and is configured to couple light into the light guide using one or more optical coupling techniques, some examples of which are provided herein.

As noted above, the light emitting element optically couples to illuminable portions of a key via a light guide. In some implementations, the light guide includes various light extraction features. As used herein, the phrase "light extraction feature" may be used to refer to a feature that is contained within, or formed on, a body or structure of the light guide that facilitates the extraction or reflection of light from the light emitting element to cause the light to illuminate portions of the key. The light extraction features may be operative to direct light out of a top surface of the light guide to illuminate the illuminable portion(s) of the key. The light extraction features may include various prisms, serrations, scallops, lenticular features, or other such shapes that reflect light into a center portion of the light guide to illuminate the illuminable portion(s). As explained in more detail below, the light extraction features may be configured and arranged to produce a substantially uniform light distribution for illuminating a symbol or glyph. The light extraction features may be positioned on or along a top surface of the light guide, on or along a bottom surface of the light guide, within the light guide, or some combination thereof. In other embodiments, a light guide, or portions of the light guide, can form a structural portion of the key in addition to directing light.

In one embodiment, the light emitting element is disposed above the flexible substrate and is positioned to transmit light into the light guide. In another embodiment, the light emitting element is disposed below the flexible substrate and is optically coupled to the light guide via an optical interface.

The optical interface is configured to optically couple or transmit light from the light emitting element(s) to the light guide. In various embodiments, the optical interface directs light from the light emitting element. Directing light may include shaping light (e.g., focusing, collimating, dispersing, and so on), reflecting light, changing direction of light, and so on. The optical interface may include one or more components or features for directing light, including reflective elements, refractive elements, lenses, collimators, prisms, serrations, scallops, and so on. The optical interface may further include reflective coatings and/or masking of components of the key stack. The optical interface may be positioned above the flexible substrate, below the flexible substrate, within the flexible substrate, or some combination thereof.

As used herein, the phrase "illuminable portion of a key" may be used to refer to a portion of a key that is configured to emit light. For example, the illuminable portion of a key may be a symbol or glyph of a keycap. The illuminable portion of a key may also include any or all areas of (or adjacent to) a keycap or other input surface that are intended to be illuminated such that the location, size, and/or functionality of that portion of the key is visually emphasized.

A symbol or glyph can be formed in an outer surface of a key from a translucent or transparent material to define an alphanumeric character, symbol, word, phrase, abbreviation, or any other linguistic, scientific, numeric, or pictographic symbol or set of symbols. In one example, the symbol itself illuminates upon activation of the light emitting element. In other examples, other portions of the key associated with the symbol illuminate upon activation of the light emitting element such as a glyph border, a glyph underline, a glyph outline, and so on. All are examples of illuminable portions of a key.

Another example of an illuminable portion of a key are geometric or structural features of the keycap. In one example, the light emitting element illuminates a keycap perimeter. In other examples, other portions of the keycap are illuminated, such as an external surface, a sidewall, a corner, and so on. In further examples, the light emitting element can illuminate spaces between one or more keys and the adjacent structure of a keyboard. For example, an aperture in which a key is disposed illuminates upon activation of the light emitting element, thereby generating a halo around a base of the key.

These and other embodiments are discussed below with reference to FIGS. 1A-14. However, those skilled in the art will readily appreciate that the detailed description given herein with respect to these Figures is for explanatory purposes only and should not be construed as limiting.

Figure 1B:
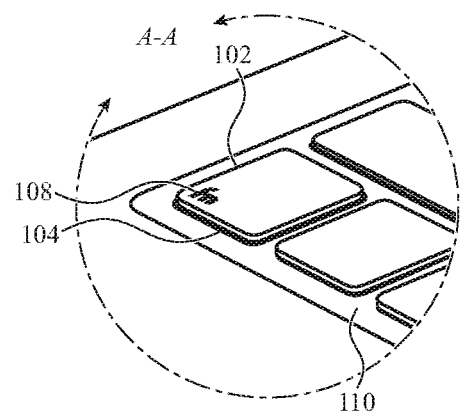
FIG. 1B depicts a removed view of greater scale of the electronic device of FIG. 1A.

FIG. 1A depicts an electronic device 100 incorporating a keyboard 101 with illuminable keys, such as the illuminable key 102 depicted in a removed view of greater scale identified by the enclosed circle A-A, shown in FIGS. 1A-1B.

The electronic device 100 includes a housing 106 and a flexible substrate 110 along a surface of the housing 106. The illuminable key 102 may be located on a surface of the housing 106 such as a surface defined by the flexible substrate 110. The illuminable key 102 may depress when a user presses the illuminable key 102. In one example, a top surface of the illuminable key 102 is flush with a top surface of the housing 106 when the illuminable key 102 is fully pressed.

A structure associated with the illuminable key 102 is disposed partially above and partially below the flexible substrate 110. The structure associated with the illuminable key 102 may be referred to as a "key stack," and can include a key assembly disposed above the flexible substrate 110 and a switch assembly (not shown in FIGS. 1A-1B) disposed below the flexible substrate 110. In various embodiments, the key assembly includes a keycap that defines at least one illuminable portion, depicted in FIG. 1A as a glyph 108.

The flexible substrate 110 may be a sheet, film, or other pliable or flexible material. Examples include fabric, polymer, leather, rubber, and so on. The flexible substrate 110 may extend over the switch assembly of the key thus forming an external surface of the housing 106 upon which the key assembly is disposed. In various embodiments, the flexible substrate 110 provides a barrier to contaminants and may also improve the visual appearance and tactile quality of the keyboard. The flexible substrate 110 may be bonded to the housing 106 and/or the key assembly and switch assembly of the keys. In one embodiment, the flexible substrate 110 includes one or more conductive traces configured to transmit signals between the illuminable key 102 and other components of the electronic device 100 such as a power source for illuminating the illuminable key 102.

As shown, the electronic device is a laptop computer, though it can be any suitable electronic device, including, for example, a desktop computer, a smart phone, an accessory, or a gaming device. Moreover, while the keyboard in FIG. 1A is incorporated with the electronic device 100, the keyboard may be separate from an electronic device. For example, the keyboard 101 may be a standalone device that is connected (via a cable or wirelessly) to a separate electronic device as a peripheral input device. The keyboard may also be integrated into another product, component, or device, such as a cover or case for a tablet computer. In such cases, the housing 106 may refer to a housing of any product, component, or device in which the keyboard is integrated or otherwise positioned.

The electronic device 100 may also include a display 116 within the housing 106. For example, the display 116 may be within or otherwise coupled to a first portion 112 of the housing 104 that is pivotally coupled to a second portion 114 of the housing 106. The keyboard 101 may be within or otherwise coupled to or incorporated with second portion 114 of the housing 106. The electronic device may include one or more input devices, including the keyboard, a trackpad 118, buttons, switches, and so on. The trackpad 118 may form an input surface on a surface of the housing 106. The trackpad 118 may be within or otherwise coupled to or incorporated with the second portion 114 of the housing 106.

While the instant application describes components of an illuminable key of a keyboard, the concepts and components described herein apply to other depressible input mechanisms as well, including buttons, standalone keys, switches, or the like. Moreover, such keys, buttons, or switches may be incorporated into other devices, including smart phones, tablet computers, or the like.

The electronic device 100 may include one or more components that interface or interoperate, either directly or indirectly, with the illuminable key 102 which are not depicted in FIGS. 1A-1B. For example, the electronic device 100 may include a processor coupled to or in communication with a memory, a power supply, one or more sensors, one or more communication interfaces, and one or more input/output devices such as a display, a speaker, a rotary input device, a microphone, an on/off button, a mute button, a biometric sensor, a camera, a force and/or touch sensitive trackpad, and so on.

Producing consistent, uniform illumination for symbols or glyphs in traditional keyboards may be difficult because of the varying shapes, sizes, and positions of symbols or glyphs for different keys. Key mechanisms, key webs, and other structural components further complicate illumination by reflecting, absorbing, redirecting, or otherwise interfering with light traveling from a light emitting element to a keycap.

Key stacks including illuminable portions described herein include various optical features for producing a uniform backlight for the keycap. The optical features of the light guide may be tailored to produce a desired light effect for a specific key symbol or glyph. The optical 4823-2383-1148 \ 1 features may also be optimized to provide substantially uniform distribution of light so that a variety of symbols or glyphs produce a consistent and uniform level of illumination.

Figure 2A:
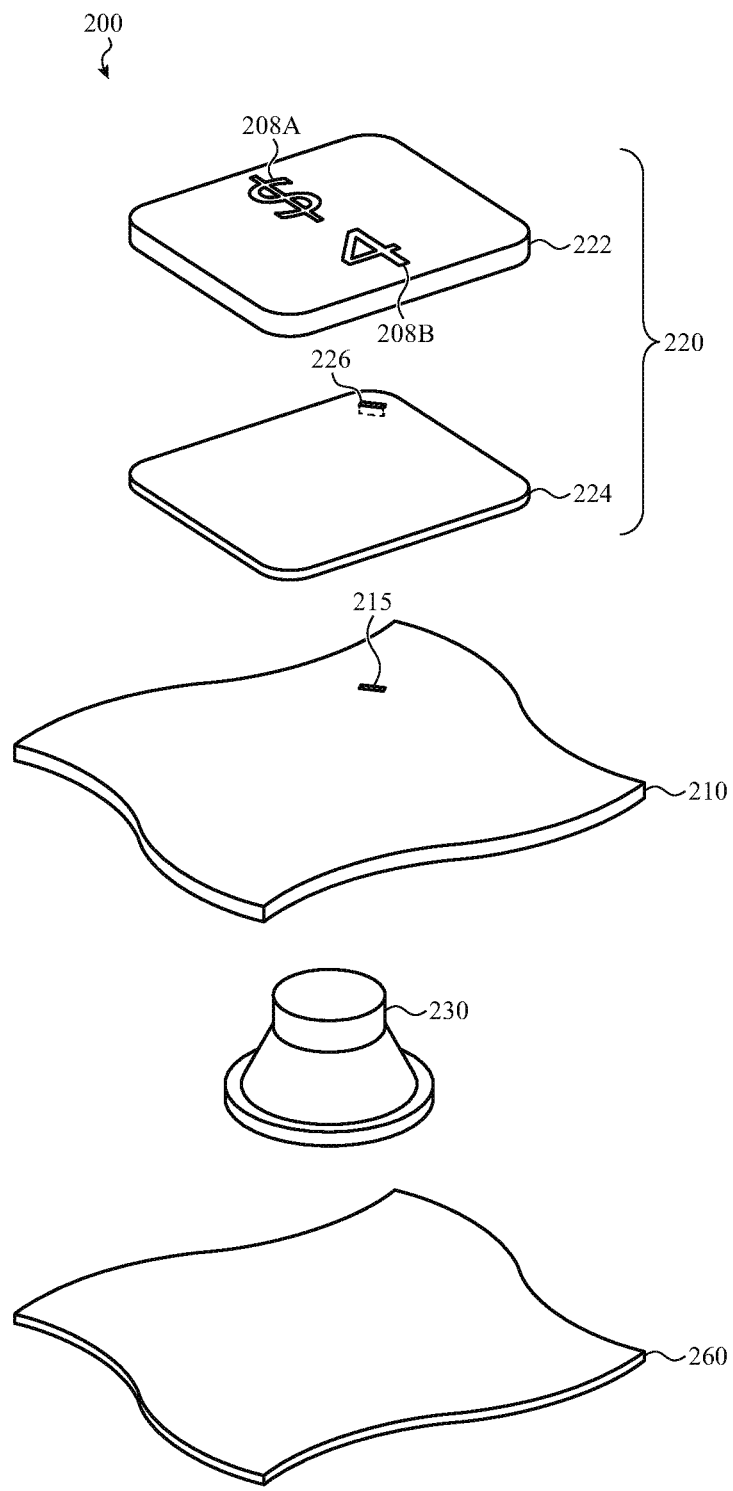
FIG. 2A depicts a schematic view of an example key stack that may be used with an illuminable key of the keyboard shown in FIGS. 1A-1B, according to an embodiment.

FIG. 2A depicts a schematic view of an example key stack 200 that may be used with an illuminable key of the keyboard shown in FIGS. 1A-1B. The key stack 200 includes a key assembly 220 disposed above a flexible substrate 210 and a switch assembly 230 disposed on a base plate 260 below the flexible substrate 210. The key assembly 220 includes a keycap 222 disposed above a light guide 224 and a light emitting element 226.

The keycap 222 defines an exterior surface of the key stack 200. The keycap 222 includes one or more illuminable portions 208 (e.g., glyphs 208A and 208B) formed of a translucent material. The illuminable portions 208 are configured to be illuminated by the light emitting element 226.

The light guide 224 is configured to transmit or direct light from the light emitting element 226 to the illuminable portions 208.

The light emitting element 226 may be positioned between the keycap 222 and the flexible substrate 210 and configured to emit light into the light guide 224. The light guide 224 optically couples the light emitting element 226 and the illuminable portions 208 of the keycap 222. The light guide 224 may be positioned between the flexible substrate 210 and the keycap 222. The flexible substrate 210 may include one or more conductive traces operably coupled to a power source of the electronic device. The conductive traces may electrically couple the light emitting element 226 to the power source.

In various embodiments, the light guide 224 includes light extraction features for directing and/or reflecting light to the illuminable portions 208 of the keycap 222. The light extraction features may produce a substantially uniform distribution of light along a bottom surface of the keycap 222 and/or a top surface of the light guide 224. As noted above, the light extraction features are features contained within, or formed on, a body or structure of the light guide that direct light from the light emitting element 226 out of the light guide 224. The light extraction features may include various prisms, serrations, scallops or other such shapes. The light extraction features may be positioned on or along an upper surface of the light guide 224, on or along a lower surface of the light guide 224, within the light guide 224, or some combination thereof. In one embodiment, the light extraction features are indentations in the light guide 224. In another embodiment, the light extraction features are protrusions from the light guide 224.

The light guide 224 may be formed from an optically translucent or transparent material such as acrylic, plastic, glass, doped plastic or glass, sapphire, zirconia, composite material, glass fiber epoxy laminate (e.g., FR4), or the like. In many examples, the light guide 224 is insert-molded into a structural body configured to contain the light guide. In other embodiments, the light guide 224 and the keycap 222 are a single part. Thus, in some embodiments, the keycap 222 is formed from acrylic, plastic, glass, doped plastic or glass, sapphire, zirconia, composite material, glass fiber epoxy laminate (e.g., FR4), or the like. The light guide 224 may be co-molded with the keycap 222. In still further examples, the light guide 224 is molded into a light guide cavity that is defined within the keycap 222. The light extraction features may be formed using a variety of techniques, including molding, laser etching, lithography, and so on.

Different keys of the keyboard may have different illuminable portions 208. For example, different keys may have illuminable portions 208 having different positions on the key, different shapes, and so on. The example key of FIG. 2A has two illuminable portions 208A and 208B, but different embodiments may have more or fewer illuminable portions. The light guide features for a particular key may be based on the illuminable portions 208 of that key so that the features direct light to the illuminable portions more effectively.

The light emitting element 226 may be positioned near, adjacent to, or within the light guide 224. In one embodiment, the light emitting element 226 is positioned in an opening in the light guide 224. In another embodiment, the light emitting element 226 is integrated with the light guide 224. The light emitting element may be positioned in a support structure within the light guide 224.

The light emitting element 226 may include one or more light-emitting diodes. The light-emitting diodes emit light of a particular color and at a particular brightness. In some embodiments, the light emitting element 226 provides light of a variable color and/or a variable brightness. In one example, the light emitting element 226 emits white light having a cool color temperature, although this is not required. The light emitting element 226 may be configured to emit light in one or more particular directions, such as toward the center of the light guide 224. The light emitted by the light emitting element may be a focused beam, a dispersed beam, a collimated beam, and so on.

The light guide 224 may be directly or indirectly coupled to the light emitting element and/or the illuminable portions 208. The light guide 224 can take a square shape, a rectangular shape, a grid shape, or any other shape or combination of shapes. In still further examples, the light guide 224 is formed as a segmented shape, such as a segmented ring. The light guide 224 may define an interior volume and perimeter surfaces. The light guide features may be located at or near the perimeter surfaces and/or within the interior volume.

Figure 3A:
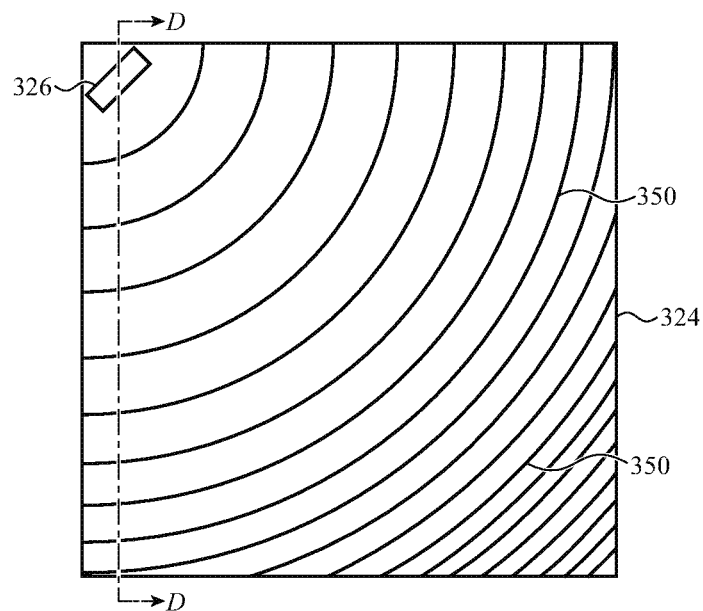
FIG. 3A illustrates an example light guide with a light emitting element, according to an embodiment.

FIGS. 3A-6 illustrate example configurations of light guides and light emitting elements such as those described herein. FIG. 3A illustrates an example light guide 324 with a single light emitting element 326 located near a corner of the light guide. The light emitting element 326 may be partially or entirely surrounded by the light guide 324 or it may be disposed on top of or below a layer defined by the light guide. The light emitting element 326 may emit light in a particular direction, such as downward and to the right (with respect to FIG. 3A) toward the center of the light guide 324.

The light guide 324 may include light extraction features 350 such as those discussed above with respect to FIG. 2A. In various embodiments, the light extraction features 350 have characteristics to produce a uniform illumination of the keycap. Characteristics of the light extraction features may include position, arrangement, size, shape, spacing, and so on. For example, the light extraction features 350 may be arranged based on the position of the light emitting element 326 and the illuminable portion(s) (not shown). In the example of FIG. 3A, the light extraction features 350 are arranged in curved lines that form a ripple pattern emanating from the position of the light emitting element 326. The spacing and/or size of the light extraction features 350 may change based on a position within the light guide 324 (e.g., based on a distance from the light emitting element 326) as shown in FIG. 3A to optimize the delivery of light to the illuminable portion(s). A space between adjacent light extraction features may vary based on a distance between the light extraction features and the light emitting element. For example, as shown in FIG. 3A, the features closer to the light emitting element 326 may be spaced farther apart than the features farther from the light emitting element 326. This may result in more effective light distribution by allowing more light to be transmitted or directed to the portions of the keycap that are farther from the light emitting element 326.

Figure 3B:
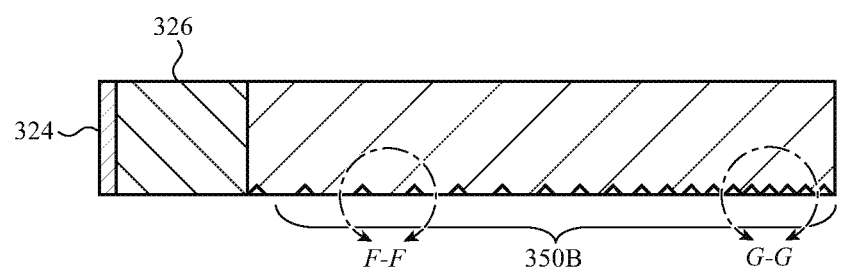
FIG. 3B illustrates an example cross-section of the light guide and light emitting element of FIG. 3A.
Figure 3C:
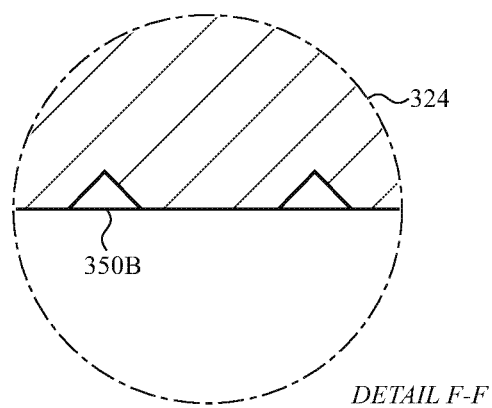
FIG. 3C illustrates a removed view of a light guide identified by the enclosed circle F-F, shown in FIG. 3B.
Figure 3D:
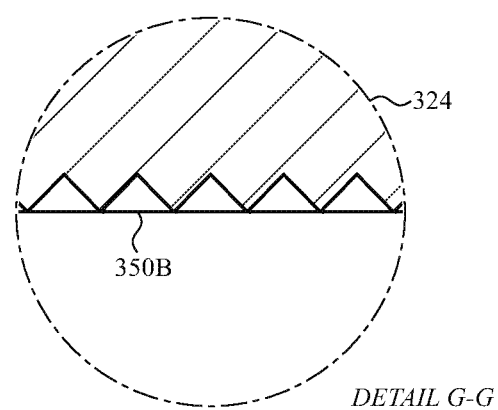
FIG. 3D illustrates a removed view of a light guide identified by the enclosed circle G-G, shown in FIG. 3B.
Figure 3E:
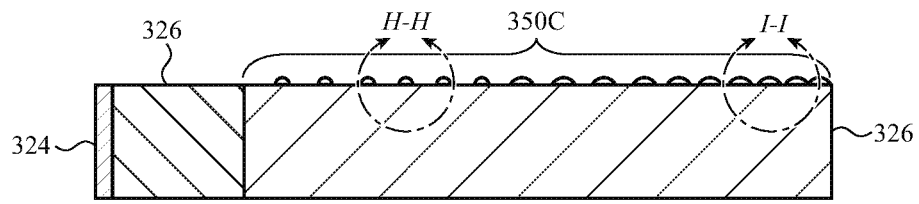
FIG. 3E illustrates an example cross-section of the light guide and light emitting element of FIG. 3A.

FIGS. 3B and 3E illustrate example cross-sections of the light guide 324 taken through section line D-D of FIG. 3A. FIG. 3B depicts light extraction features 350B disposed on or near a bottom surface of the light guide 324. The light extraction features 350B of FIG. 3B are serrated features (e.g., grooves with an iscosceles- or other type of triangular cross-section) configured to direct or transmit light to the illuminable portions of the keycap. For example, the light extraction features 350B may reflect light upward toward the keycap or an upper surface of the light guide 324.

FIG. 3E depicts light extraction features 350C disposed on or near a top surface of the light guide 324. The light extraction features 350C of FIG. 3E are lenticular features (e.g., rounded features) configured to direct or transmit light to the illuminable portions of the keycap. For example, the light extraction features 350C may refract light upward toward the keycap or an upper surface of the light guide 324.

As illustrated in FIGS. 3B and 3E, the spacing and/or size of the light extraction features 350 may vary within the light guide 324. In the example of FIG. 3B, the light extraction features 350B are spaced farther apart as the distance from the light emitting element 326 increases, as depicted in a removed view of greater scale identified by the enclosed circles F-F and G-G, shown in FIGS. 3C-3D. The greater spacing between the features closer to the light emitting element causes less light to be directed by the features closer to the light emitting element and allows the light extraction features to produce a uniform illumination of an upper surface of the light guide 324, the keycap (not pictured), and/or an illuminable portion of the keycap.

Figure 3F:
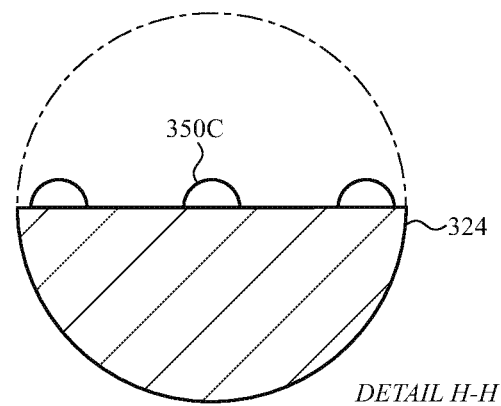
FIG. 3F illustrates a removed view of a light guide identified by the enclosed circle H-H, shown in FIG. 3E.
Figure 3G:
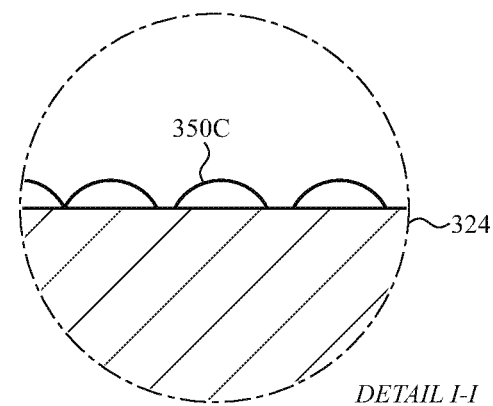
FIG. 3G illustrates a removed view of a light guide identified by the enclosed circle I-I, shown in FIG. 3E.

In the example of FIG. 3E, the light extraction features 350C change size and spacing as the distance from the light emitting element changes, as depicted in a removed view of greater scale identified by the enclosed circles H-H and I-I, shown in FIGS. 3F-3G. In various embodiments, the light extraction features may vary in size, shape, spacing, and other characteristics to maximize delivery of light to the illuminable portion(s) of the keycap. Variations in size, shape, spacing, and/or other characteristics may be based on a position within the light guide 324, a distance from the light emitting element 326, a position of the illuminable portion(s) of the keycap, and/or other characteristics of the key stack.

As noted above, the light extraction features 350 may be formed using a variety of techniques, including molding, laser etching, lithography, and so on. In one embodiment, the light extraction features are indentations in the light guide 324. In another embodiment, the light extraction features are protrusions from the light guide 324. As shown in FIGS. 3B-3C, the light extraction features 350 may be extrusions in a surface of the light guide 324 and/or protrusions from a surface of the light guide 324.

Figure 3H:
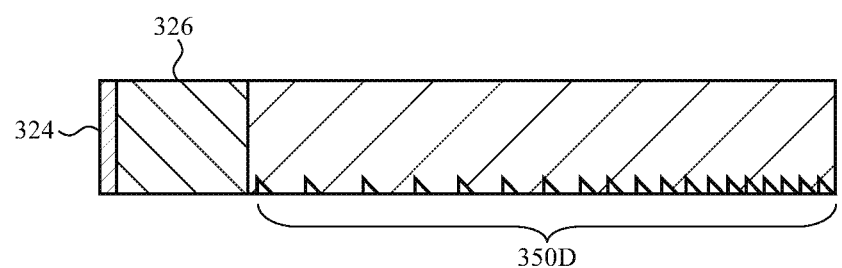
FIG. 3H illustrates an example cross-section of the light guide and light emitting element of in accordance with an additional configuration of the embodiment of FIG. 3A.

FIG. 3H shows a cross-section of the light guide 324 of FIG. 3A in accordance with another embodiment of the disclosure. In this configuration, the light extraction features 350D can include grooves with right-triangular or "sawtooth" profiles, wherein a first side of the triangle profile is oriented perpendicular to the outer surface of the light guide 324 (or perpendicular to the direction of light emitted from the light emitting element 326—referred to as the vertical sidewall), and a second side of the triangle profile slopes from the innermost end of the first side to the outer surface (referred to as the angled sidewall). In this embodiment, the vertical sidewall of the profile is closer to the light emitting element 326 than the angled sidewall, but in other embodiments, the angled sidewall of the profile can be positioned closer to the light emitting element 326 than the vertical sidewall. As compared to the embodiment of FIG. 3B, the configuration of FIG. 3H can direct light from the light emitting element 326 more towards the top right corner of the light guide 324. Thus, this configuration can increase the amount of light distributed to the areas of the light guide positioned farthest from the light emitting element 326.

Figure 4A:
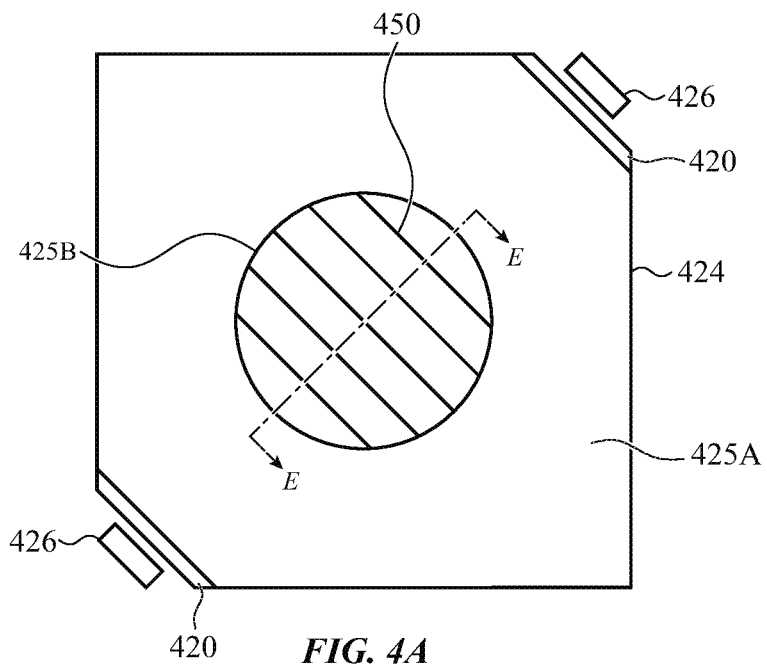
FIG. 4A illustrates an example light guide and light emitting elements, according to an embodiment.

FIG. 4A illustrates an example light guide 424 with two light emitting elements 426 disposed at opposite corners of the light guide. The light emitting elements 426 may emit light in one or more directions, and may emit light in different directions from one another. In one embodiment, each of the light emitting elements 426 emits light toward the center of the light guide 324.

In the embodiment of FIG. 4A, the light emitting elements 426 are positioned near a side of the light guide 424 and configured to direct or transmit light into the light guide 424 (e.g., into a sidewall of the light guide 424). A light transmission feature 420 may be positioned between the light emitting element 426 and the light guide 424 to facilitate or maximize the transmission of light into the light guide 424. In one embodiment, the light transmission feature 420 is a lens or other optical element configured to maximize the transmission of light into the light guide 424. The light guide 424 includes feature regions 425A and 425B having different light extraction features, for example to maximize the light delivered to the illuminable portion(s) of the key. In one embodiment, the region 425A does not include light extraction features. In another embodiment, the region 425A includes light extraction features such as a reflective coating. Region 425B includes features 450 configured to direct or transmit light to an illuminable portion (e.g., above the region 425B).

In various embodiments, the light guide 424 may include feature regions having different light extraction features, arrangements, sizes, spacing, and so on. The shapes and positions of the feature regions may vary from the example regions of FIG. 4A based on characteristics of the illuminable portion(s) and other considerations. For example, in one embodiment, a feature region with light extraction features has a shape that corresponds to a shape of the illuminable portion(s) of the keycap. Feature regions may be located directly beneath the illuminable portions, or at different positions within the light guide and at different positions relative to the illuminable portion(s). Further, some regions may not include light extraction features. In one embodiment, the light guide does not include distinct feature regions.

Figure 4B:
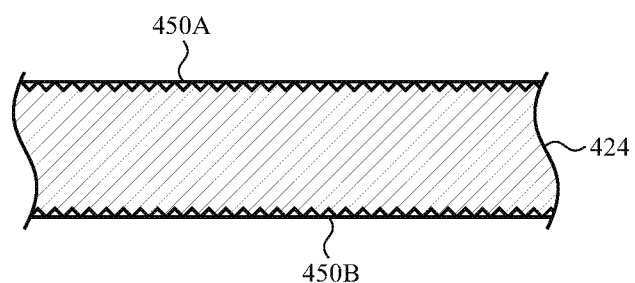
FIG. 4B illustrates an example cross-section of the light guide and light emitting elements of FIG. 4A.

FIG. 4B illustrates a cross-section of the light guide 424 taken through section line E-E of FIG. 4A. FIG. 4B illustrates light extraction features 450A on a top surface of the light guide 424 and light extraction features 450B on a bottom surface of the light guide. As shown in FIGS. 4A-4B, the light extraction features 450A-450B are oriented perpendicular to a path between the light emitting elements and the light extraction features to maximize the transmission of light to the illuminable portion. In various embodiments, the light extraction features may be positioned in different positions and/or orientations to maximize light transmission.

In some embodiments, the light extraction features 450A-450B can be configured with right-triangular profiles similar to the light extraction features 350D shown in FIG. 3H. A first portion of the light extraction features 450A-450B can have cross-sectional profiles wherein the vertical sidewall of the right-triangular profile shape is closer to the light-emitting element 426 of one corner of the light guide 424, and a second portion of the light extraction features 450A-450B can have cross-sectional profiles that have the vertical sidewall closer to the light-emitting element 426 at the opposite corner of the light guide 424. In this way, the two portions of the light extraction features 450A-450B can direct light toward the centerline of the light guide 424 between the light-emitting elements 426.

Figure 5:
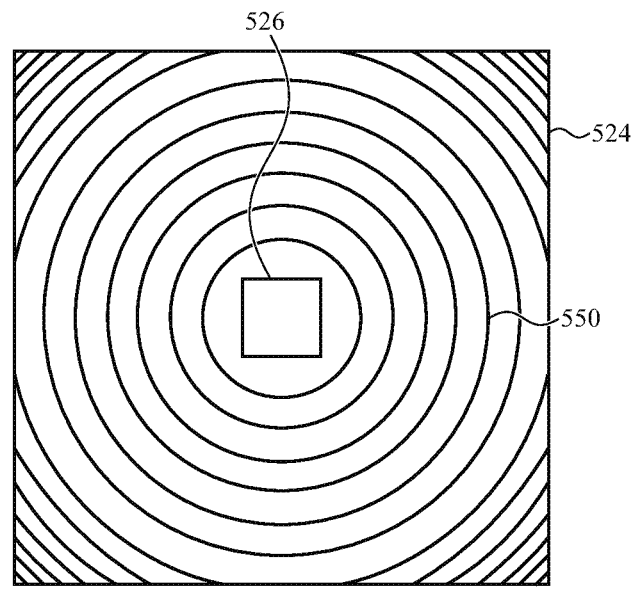
FIG. 5 illustrates an example light guide and light emitting element, according to an embodiment.

FIG. 5 illustrates an example light guide 524 with a light emitting element 526 disposed near a center of the light guide. Light extraction features 550 are arranged as concentric circles centered around the light emitting element 526. The light emitting element 526 may emit light in any direction or directions. For example, the light emitting element 526 may emit light outward in multiple directions along the plane defined by the light guide 524 as well as directions not along the plane (e.g., in and out of the page with respect to FIG. 5).

Figure 6:
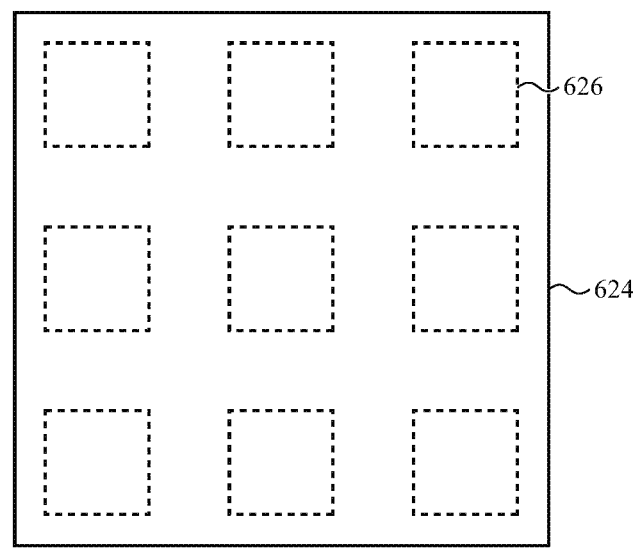
FIG. 6 illustrates an example light guide and light emitting elements, according to an embodiment.

FIG. 6 illustrates an example light guide 624 with an array of light emitting elements 626 disposed below, or within the light guide. In one embodiment, the light emitting elements 626 are configured to direct or transmit light through the light guide (e.g., out of the page). In various embodiments, the light emitting elements 626 may be configured to emit light in any direction. The light emitting elements 626 may be separately controllable or drivable to direct light to illuminable portions of the key. The light guide 624 may include light extraction features disposed around, above, and/or below the light emitting elements 626 to direct light to illuminable portions of the key.

Returning now to FIG. 2A, the flexible substrate 210 is disposed between the key assembly and the switch assembly of the key stack 200. As noted above, the flexible substrate 210 may be a sheet or film such as a fabric, polymer, or leather sheet, thermoplastic polyurethane (TPU), silicone, thermoplastic elastomer (e.g., HYTREL® from DUPONT®), or any other appropriate deformable or flexible substrate or sheet. In one embodiment, the flexible substrate 210 includes one or more folded perimeter features to facilitate movement of a movable portion of the flexible substrate relative to the rest of the flexible substrate when the key assembly is depressed. Folded perimeter features are discussed in more detail below with respect to FIG. 13A. In another embodiment, the flexible substrate 210 does not include the folded perimeter features and deforms or flexes when the key is depressed.

As noted above, the flexible substrate 210 includes one or more conductive traces that may electrically couple the light emitting element 226 and/or other components of the key stack to a power source of the electronic device. In one embodiment, the conductive trace is integrated into the flexible substrate. The conductive traces may be included in the flexible substrate 210 using a variety of methods or techniques, including weaving the conductive threads into the flexible substrate, painting a conductive material onto the flexible substrate, and so on.

Figure 2B:
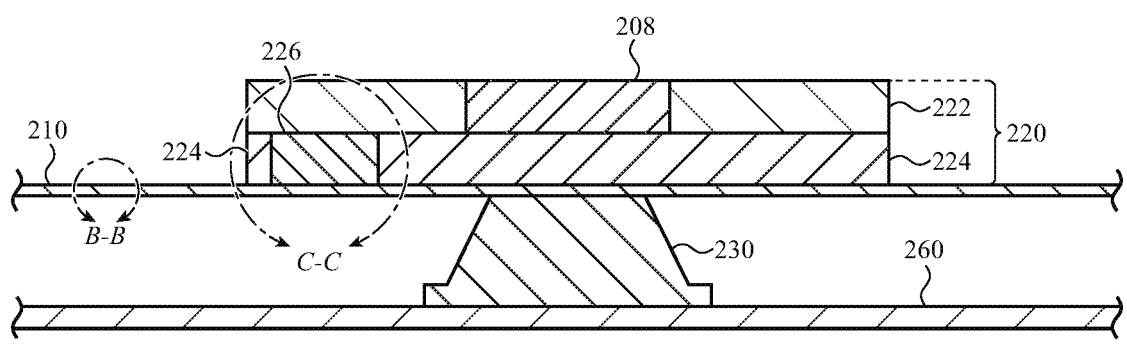
FIG. 2B illustrates a cross-section view of an example key stack, according to an embodiment.
Figure 2C:
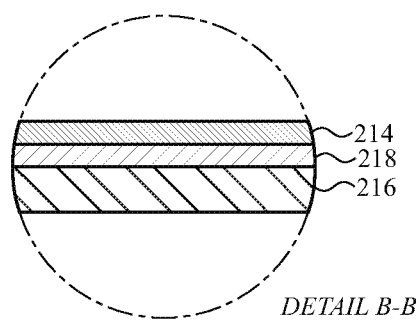
FIG. 2C illustrates a removed view of a flexible substrate identified by the enclosed circle B-B, shown in FIG. 2B.

FIG. 2B illustrates a cross-section view of an example key stack (e.g., key stack 200). FIG. 2C illustrates a removed view of the flexible substrate 210 at greater scale identified by the enclosed circle B-B, shown in FIG. 2B. As shown in FIG. 2C, the flexible substrate may include a first layer 214, a second layer 216, and a conductive trace 218. The first and second layers 214, 216 may be formed of different materials and/or have different characteristics. In one embodiment, the first layer 214 includes cosmetic features such as a particular finish or feel because it may be located on an exterior surface of the electronic device. The conductive traces can comprise a conductive metallic or nonmetallic material such as, for example, copper, silver, aluminum, graphite, a conductive polymer, and related materials.

In the embodiment of FIG. 2C, the conductive trace 218 is located between two layers 214, 216, but in various embodiments, the flexible substrate 210 may include more or fewer layers, and the conductive trace 218 may be located above and/or below one or more layers at any suitable location.

Figure 2D:
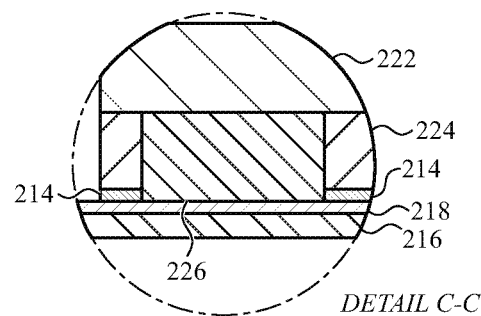
FIG. 2D illustrates a removed view of a flexible substrate identified by the enclosed circle C-C, shown in FIG. 2B.

FIG. 2D illustrates a removed view of the flexible substrate 210 at greater scale identified by the enclosed circle C-C, shown in FIG. 2B. FIG. 2D illustrates the light emitting element 226 coupled to the flexible substrate 210. The flexible substrate 210 includes an opening 215 (FIG. 2A) in the layer 214 that allows the conductive trace 218 to be coupled to the light emitting element 226. In one embodiment, the light emitting element 226 is disposed in the opening such that a portion of the light emitting element 226 is below the top surface of the flexible substrate 210 and contacting the conductive trace 218. In another embodiment, the light emitting element 226 is above the flexible substrate 210 and a connector electrically couples the light emitting element 226 to the conductive trace 218. The connector may include a conductive material capable of electrically coupling the conductive trace 218 and the light emitting element 226. The connector may be integrated as part of the light emitting element 226 and/or the flexible substrate 210, for example as an electrical contact.

Returning to FIG. 2A, the key stack 200 may include a switch assembly 230 for facilitating movement of the key assembly 220 and detecting inputs in response to forces applied at the keycap 222. The switch assembly 230 upwardly biases an input member (e.g., the keycap 222, light guide 224, and/or flexible substrate 210). The switch assembly 230 is configured to actuate a switch (not pictured) in response to the input member translating. In particular, the input member is configured to transmit a force applied to the keycap 222 to the switch, thereby actuating the switch. This, in turn, causes an input to be registered by the electronic device.

The switch assembly 230 may generally bias the input member upward (with respect to the view of FIG. 2B), thereby keeping the input member in a default or rest position in the absence of external force. Likewise, when force is removed from the input member after the input member translates, the switch assembly 230 returns to its default configuration as shown in FIG. 2B, thereby moving the input member from a depressed to rest position.

As noted above, in one embodiment, the input member is the key assembly 220 and/or the flexible substrate 210. In another embodiment, a separate input member is positioned below the flexible substrate 210, for example as shown below with respect to FIG. 13A.

In the depicted example, the switch assembly 230 is a collapsible dome disposed on the base plate 260. The input member may be configured to transmit a force from the keycap 222 to the collapsible dome, thereby collapsing the dome and actuating a switch. This, in turn, causes an input to be registered by the electronic device. In addition, the collapsible dome may generally bias the input member upward (with respect to the view of FIG. 2B), thereby keeping the key mechanism in a default or rest position in the absence of external force. Likewise, when force is removed from the input member after the dome collapses, the dome (or other switch) returns to its default configuration, thereby moving the input member from a depressed to a rest position.

The switch assembly 230 of FIGS. 2A-2B is merely one example of a switch assembly 230. In one embodiment, the switch assembly includes multiple components, such as a key mechanism, a switch, and/or a switch housing, as discussed in more detail with respect to FIGS. 13A-13B.

The base plate 260 may provide a rigid support structure for the various components forming the key stack 200 and other components of the keyboard assembly. The base plate 260 can be a printed circuit board (PCB). The base plate 260 may include a plurality of electrical traces (not shown) formed therein that may be in electrical communication with distinct components or layers of the key stack 200. The traces may subsequently provide an electrical signal (e.g., input) to the electronic device when an input is received at the key stack 200, as discussed herein.

The embodiments described with respect to FIGS. 2A-6 are generally directed to key stacks that include a light emitting element disposed above a flexible substrate. Other embodiments may include one or more light emitting elements positioned below or within a flexible substrate. A key stack with a light emitting element positioned below a flexible substrate may require an optical interface for transmitting or directing light from the light emitting element to a light guide and/or keycap positioned above the flexible substrate.

Figure 7A:
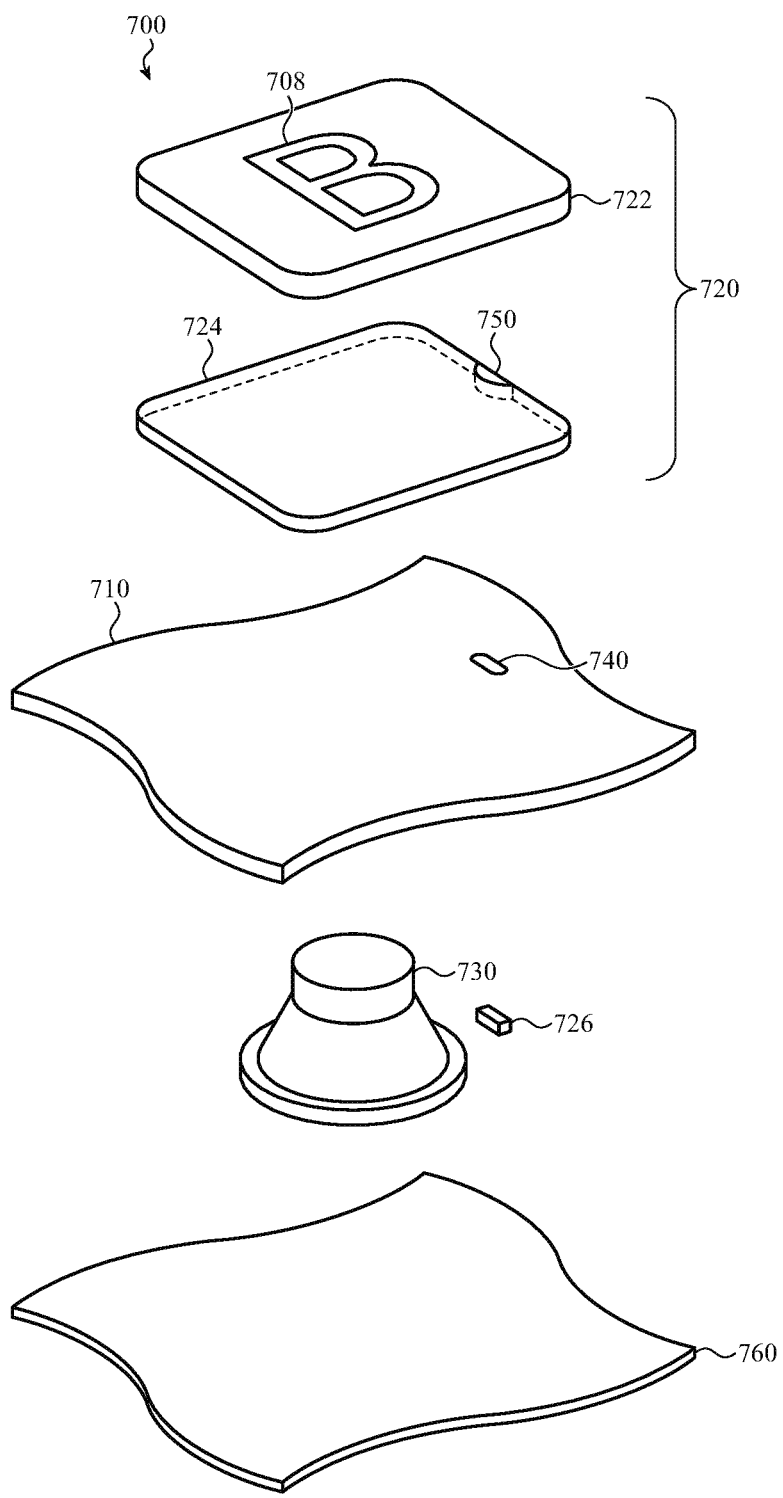
FIG. 7A depicts a schematic view of an example key stack that may be used with an illuminable key of a keyboard, according to an embodiment.

FIG. 7A depicts a schematic view of an example key stack 700 that may be used with an illuminable key of a keyboard. The key stack 700 is similar to the key stack 200, and includes a key assembly 720 disposed over a flexible substrate 710 and a switch assembly 730 disposed below the flexible substrate 710.

The key stack 700 includes a light emitting element 726 positioned below the flexible substrate 710 and operative to illuminate an illuminable portion 708 of a keycap 722. The light emitting element 726 is optically coupled to the illuminable portion 708 via an optical interface 750 and a light guide 724. In one embodiment, the flexible substrate 710 includes a passage 740 that allows light to pass from the light emitting element 726 through the flexible substrate 710 to the key assembly 720.

In one embodiment, the optical interface 750 optically couples the light emitting element 726 with the light guide 724 and is configured to direct or transmit light from the light emitting element 726 to the light guide 724. In the embodiment of FIG. 7A, the optical interface 750 may include a reflector configured to reflect light into the light guide 724 and a lens configured to disperse light evenly into the light guide. In various embodiments, the optical interface 750 may include one or more components or features for directing light, including reflective elements, refractive elements, lenses, collimators, prisms, serrations, scallops, and so on, as described below with respect to FIGS. 8-12. Directing light may include shaping light (e.g., focusing, collimating, dispersing, and so on), reflecting light, changing direction of light, and so on. The optical interface 750 may further include reflective coatings and/or masking of components of the key stack 700. The optical interface 750 is positioned such that light emitted by the light emitting element 726 passes through the optical interface 750 and into the light guide 724.

Figure 7B:
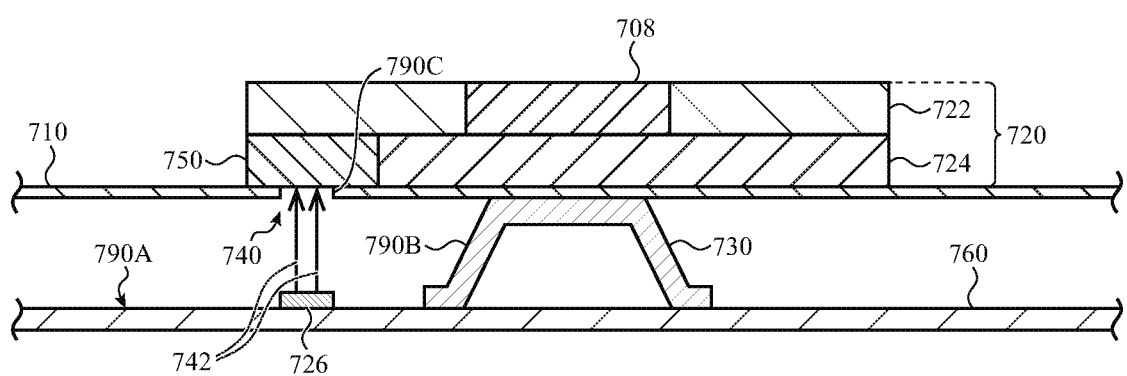
FIG. 7B is a cross-section of an example key stack including an optical interface, according to an embodiment.

FIG. 7B is a cross-section of an example key stack including an optical interface (e.g., key stack 700) with example light rays 742 passing from the light emitting element 726, through the passage 740 and optical interface 750 and into the light guide 724. The light guide 724 directs light to the illuminable portion 708 of the keycap 722 as discussed above with respect to FIGS. 2A-6. As shown in FIG. 7B, the optical interface 750 changes the direction of travel of the light emitted from the light emitting element from upward to rightward (with respect to FIG. 7B). In some embodiments, the light guide 724 can include serrations or sawtooth grooves in its surface such as the light extraction features 350, 450 of the embodiments of FIG. 3B. 3E, 3H, or 4A. In embodiments with light extraction features having right-triangular profile shapes, the vertical sidewalls of the profile shapes can be positioned closer to the optical interface 750 than to the opposite side of the light guide 724. Light extraction features can also be implemented in the light guides of FIGS. 8-13C.

In one embodiment, elements of the optical interface 750 are positioned in a layer defined by the light guide 724 as shown in FIGS. 7A-7B. In other embodiments, elements of the optical interface 750 may be positioned at various positions in the key stack 700, including above the flexible substrate 710, below the flexible substrate 710, within the flexible substrate 710, extending through the passage 740 of the flexible substrate 710, or some combination thereof. In one embodiment, the optical interface 750 includes multiple components and/or features disposed at different positions in the key stack 700.

The optical interface 750 may include one or more components or features (e.g., reflectors, prisms, lenses, and so on) disposed beneath, within, and/or above the flexible substrate 710. In one embodiment, a lens (e.g., an optical collimating lens) is positioned above or otherwise near the light emitting element 726 and is configured to direct light (e.g., as a collimated beam) through the passage 740 to other components of the optical interface 750 and/or the light guide 724.

The elements of the optical interface 750 may partially or entirely integrated with one or more components of the key stack 700, including the keycap 722, the light guide 724, the flexible substrate 710, the switch assembly 730, and so on. In one embodiment, the optical interface includes one or more structural components that provide structural support for the key stack 700 in addition to directing light. For example, the optical interface may include a collapsible element (e.g., a light tube) that directs light, and serves as a key mechanism and/or switch as discussed below with respect to FIG. 9.

The optical interface 750 may include optical coatings on various surfaces of the key stack 700, including layers of metal (e.g., aluminum, silver), dielectrics (e.g., magnesium fluoride, calcium fluoride, and so on), and the like. For example, surfaces 790A, 790B, and 790C may include reflective coatings to direct light through the passage 740 and avoid light loss.

The light emitting element 726 is similar to the light emitting element 226 of FIGS. 2A-2B, and may include one or more light-emitting diodes. The light emitting element 726 may be disposed on the base plate 760 as shown in FIGS. 7A-7B. In other embodiments, the light emitting element 726 may be disposed at any position below the flexible substrate 710. The light emitting element 726 may be disposed on, in or integrated with a switch housing, a key mechanism, and/or a switch. The embodiment shown in FIG. 7A includes one light emitting element 726, but in various embodiments, multiple light emitting elements 726 may be used.

In one embodiment, the light emitting element 726 is electrically coupled to a power source via conductive traces in the flexible substrate 710. In another embodiment, the light emitting element is electrically coupled to a power source via conductive traces in the base plate 760 and/or the switch assembly 730.

Figure 8:
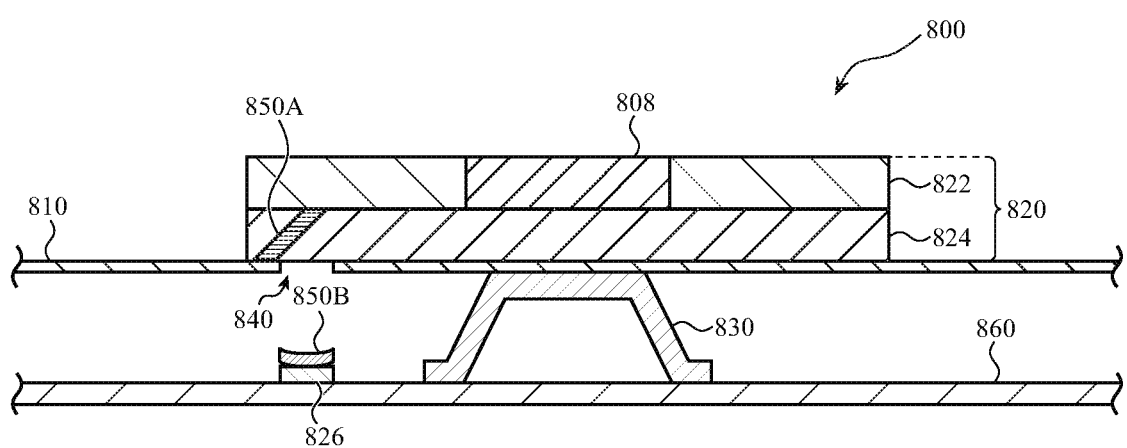
FIGS. 8-12 illustrate cross-sections of an example key stacks including an optical interface.

FIG. 8 illustrates a cross-section of an example key stack 800 including an optical interface, as described herein. The key stack 800 is similar to the key stack 700 described above with respect to FIGS. 7A-7B. The key stack 800 includes a light emitting element 826 disposed on a base plate 860.

The key stack 800 may include a lens 850B optically coupled to the light emitting element 826 and configured to direct light upward with respect to FIG. 8 and through the passage 840. In one embodiment, the lens is a collimator configured to collimate the light from the light emitting element 826.

The key stack 800 may include a reflective element 850A such as a mirror or other object with a reflective surface optically coupled to the light emitting element 826. The reflective element 850A is configured to direct light passing through the passage 840 in the fabric layer 810 and into the light guide 824. In one embodiment, the reflective element redirects light traveling generally upward (with respect to FIG. 8) to travel generally rightward (with respect to FIG. 8). Depending on characteristics of the key stack 800, such as the location of the illuminable portion 808, the reflective element 850A may be configured to reflect a portion of incident light and transmit a portion of incident light. For example, the reflective element may allow between 5% and 20% of light to pass through while reflecting the remaining light.

Figure 9:
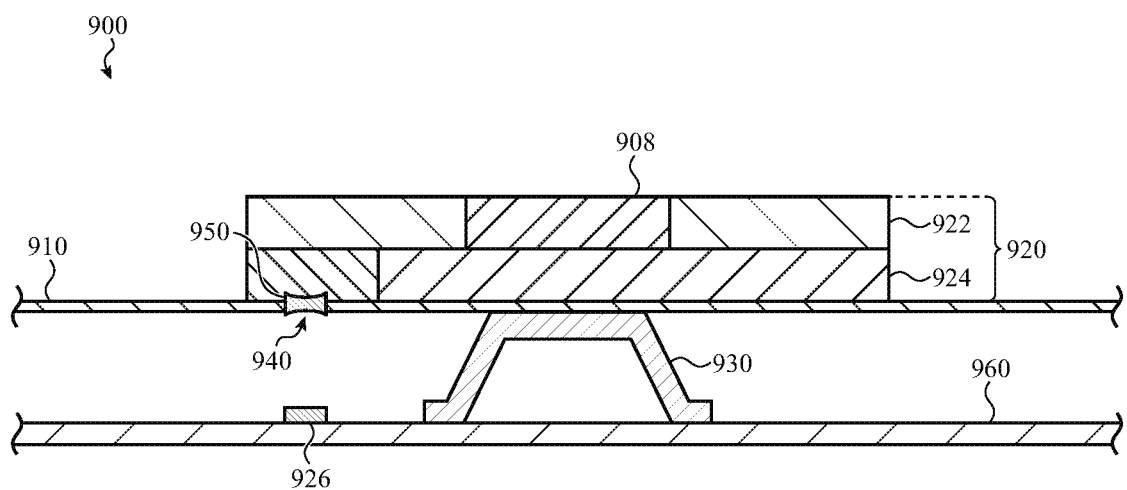

FIG. 9 illustrates a cross-section of an example key stack 900 including an optical interface, as described herein. The key stack 900 is similar to the key stack 700 described above with respect to FIGS. 7A-7B. The key stack 900 includes a light emitting element 926 disposed on a base plate 960.

The key stack 900 may include a lens 950 optically coupled to the light emitting element and the light guide 924 and configured to collect light from the light emitting element and/or direct light into the light guide. In one embodiment, the lens 950 is disposed entirely or partially within the passage 940 in the flexible substrate 910. In another embodiment, the lens 950 is disposed above or below the flexible substrate 910. In one embodiment, the lens 950 is a diverging lens such that light passing through the lens diverges. In another embodiment, the lens 950 is a converging lens such that light passing through the lens converges.

Figure 10:
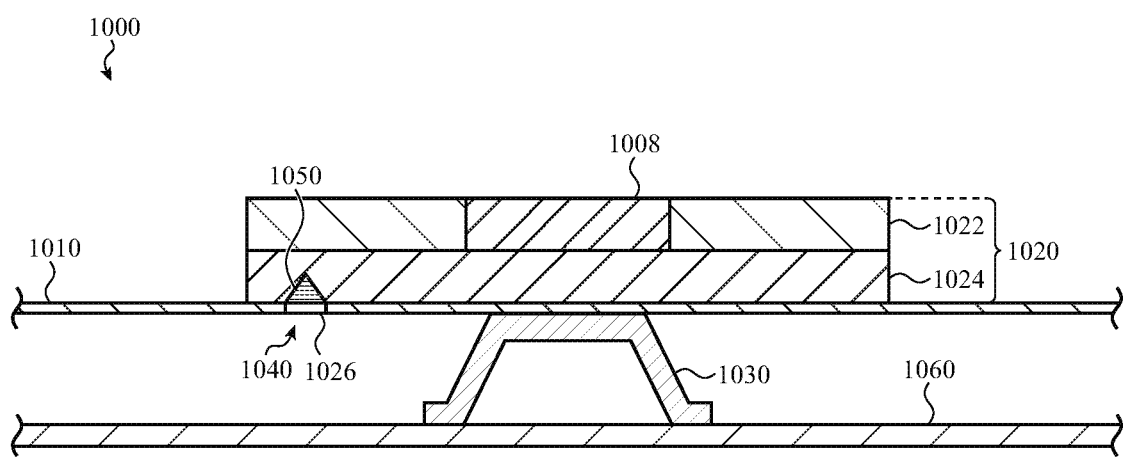

FIG. 10 illustrates a cross-section of an example key stack 1000 including an optical interface, as described herein. The key stack 1000 is similar to the key stack 700 described above with respect to FIGS. 7A-7B. The key stack 1000 includes a light emitting element 1026 disposed at least partially in a passage 1040 in a flexible substrate 1010.

The key stack 1000 may include a prism 1050 optically coupled to the light emitting element and the light guide 1024 and configured to direct light into the light guide. In one embodiment, the prism is 1050 is disposed entirely or partially within the passage 1040 in the flexible substrate 1010. In another embodiment, the prism 1050 is disposed above or below the flexible substrate 1010. In one embodiment, the prism 1050 is a deflecting prism configured to deflect (e.g., redirect) the light emitted by the light emitting element 1026.

Figure 11:
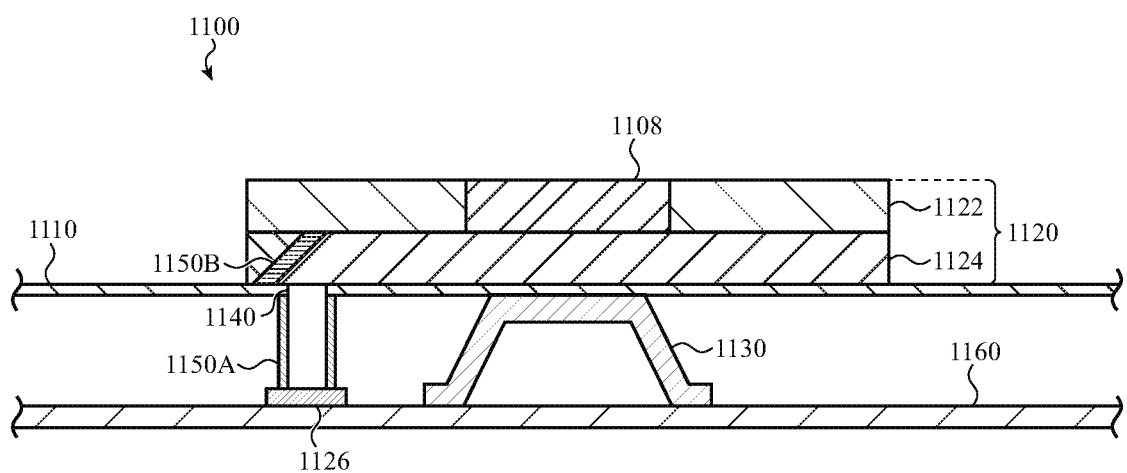

FIG. 11 illustrates a cross-section of an example key stack 1100 including an optical interface, as described herein. The key stack 1100 is similar to the key stack 700 described above with respect to FIGS. 7A-7B. The key stack 1100 includes a light emitting element 1126 disposed beneath a flexible substrate 1110 (e.g., on a base plate 1160).

The key stack 1100 may include a light tube 1150A optically coupled to the light emitting element 1126 and configured to direct light through the flexible substrate 1110 to a light guide 1124. In one embodiment, the light tube 1150A extends through a passage 1140 in the flexible substrate 1110. The light tube 1150A may be optically coupled to one or more optical elements 1150B (e.g., the reflective element 850A, the lens 950, the prism 1050, and so on) to transport light to the light guide 1124.

The light tube 1150A may be a hollow structure that includes a reflective lining to minimize light loss. In one embodiment, the light tube 1150A is coupled to the key assembly 1120 and the switch assembly 1130. The light tube may be capable of buckling, compressing, collapsing, or otherwise deforming when the key assembly 1120 moves relative to the switch assembly 1130 (e.g., when the key is pressed).

Figure 12:
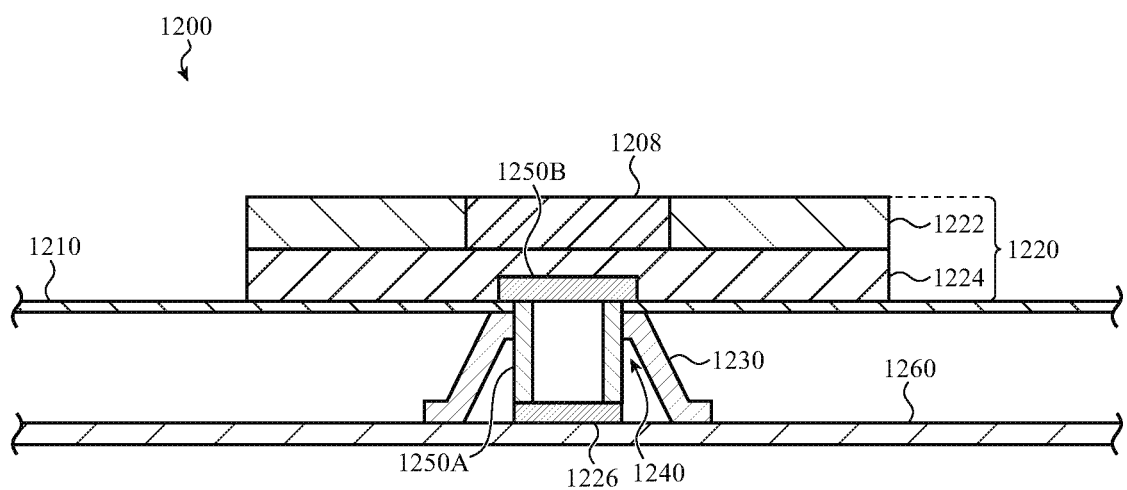

FIG. 12 illustrates a cross-section of an example key stack 1200 including an optical interface, as described herein. The key stack 1200 is similar to the key stack 700 described above with respect to FIGS. 7A-7B. The key stack 1200 includes a light emitting element 1226 disposed beneath a flexible substrate 1210.

The key stack 1200 includes a switch assembly 1230 for facilitating movement of the key assembly 1220 and detecting inputs in response to forces applied at the keycap 1222. The switch assembly 1230 includes a key mechanism 1250A that movably supports the key assembly 1220 relative to the switch assembly 1230, similar to the key mechanism discussed above with respect to FIGS. 2A-2B.

In one embodiment, the key mechanism 1250A is disposed above the light emitting element 1226 (with respect to FIG. 12). The key mechanism 1250A may be configured to transport light from the light emitting element 1226 through the flexible substrate 1210. For example, the key mechanism 1250A may be an element capable of buckling, compressing, collapsing, or otherwise deforming such as a dome or a tube. The key mechanism 1250A may have a hollow or translucent portion with reflective coating that is optically coupled to the light emitting element 1226 and configured to transport light in a similar manner as the light tube 1150A of FIG. 11. In one embodiment, the key mechanism 1250A extends through a passage 1240 in the flexible substrate 1210 and is optically coupled to the light guide 1224. The key mechanism 1250A may be optically coupled to one or more optical elements 1250B (e.g., the reflective element 850A, the lens 950, the prism 1050, and so on) to transport light to the light guide 1224.

In one embodiment, the key mechanism 1250A is further configured to detect inputs. For example, the key mechanism 1250A may be a collapsible dome as discussed above with respect to FIG. 2B. In another embodiment, the switch assembly 1230 includes a switch to detect inputs.

Figure 13A:
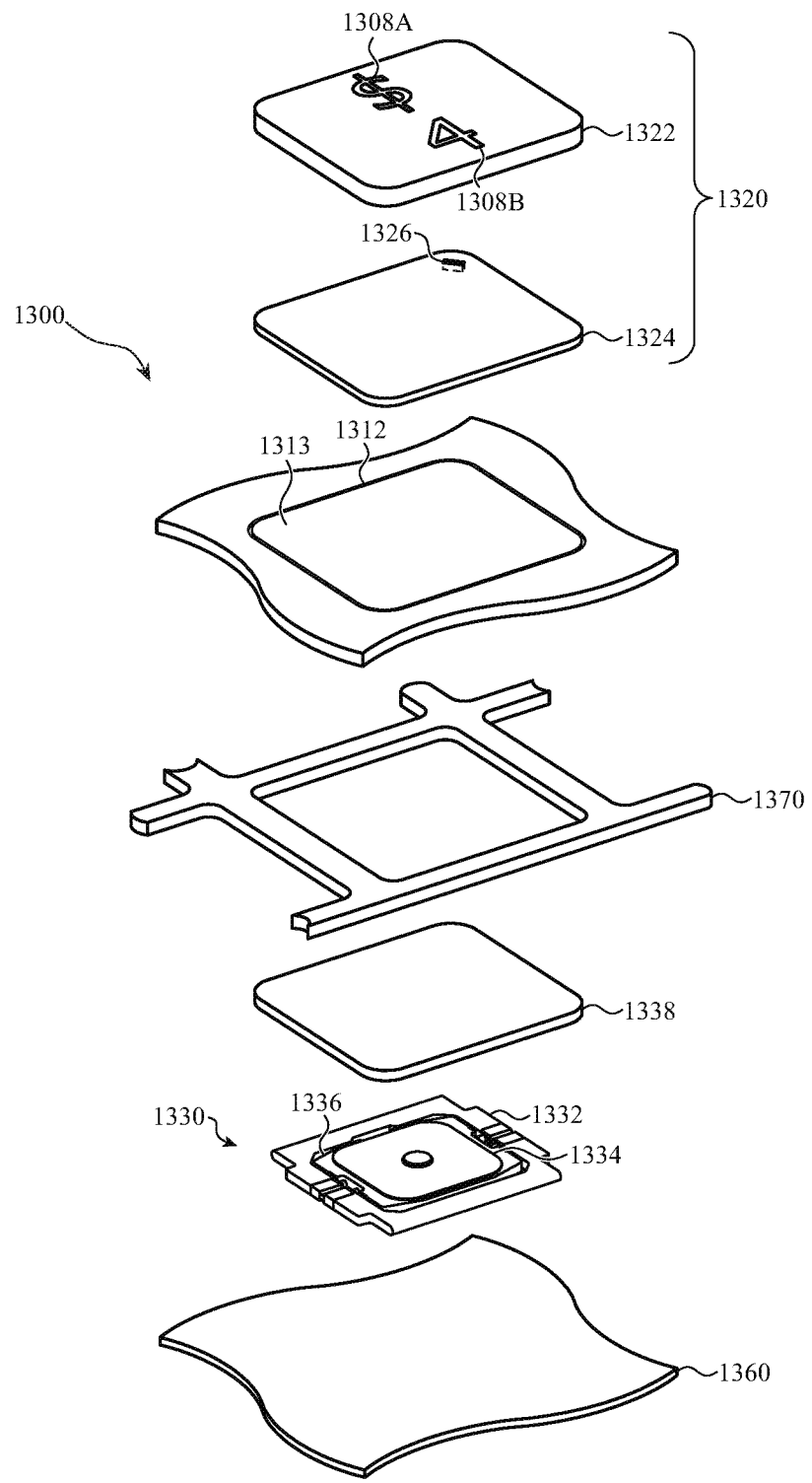
FIG. 13A depicts a schematic view of an example key stack that may be used with an illuminable key of a keyboard, according to an embodiment.

FIGS. 2A-12 illustrate example embodiments of key stacks for directing light from a light emitting element to an illuminable portion of a key using a light guide and/or an optical interface. The embodiments described with respect to FIGS. 2A-12 are example embodiments, and the components and/or the arrangement of components may differ in alternate embodiments. For example, the switch assembly may be a different type of switch mechanism. FIG. 13A illustrates a schematic view of an example key stack 1300 that may be used with an illuminable key of a keyboard. The key stack 1300 is similar to and may include one or more components of the key stacks discussed herein (e.g., key stack 200, key stack 700, and so on).

Figure 13B:
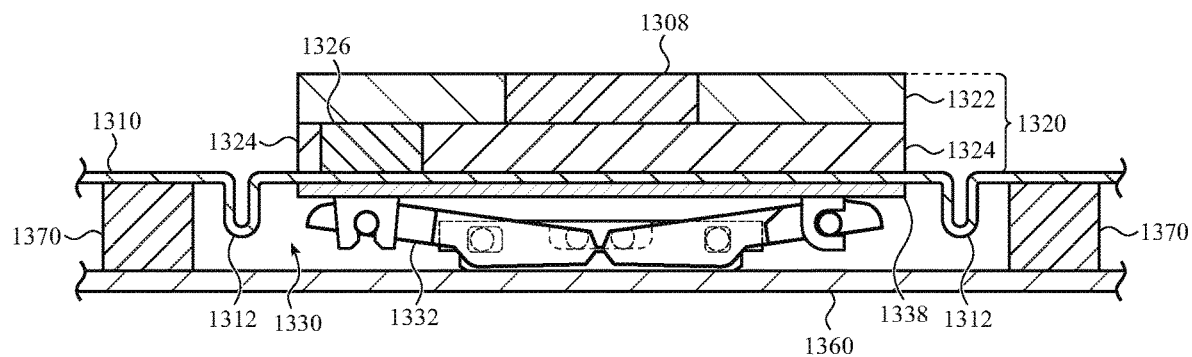
FIG. 13B is a cross-section of an example key stack, according to an embodiment.

The key stack 1300 includes a flexible substrate 1310 disposed between the key assembly 1320 and the switch assembly 1330 of the key stack 1300. As noted above, the flexible substrate 1310 may be a sheet or film such as a fabric, polymer, or leather sheet, or any other appropriate deformable or flexible substrate or sheet. In one embodiment, the flexible substrate 1310 includes one or more folded perimeter features 1312 to facilitate movement of a localized region (e.g., the movable portion 1313) of the flexible substrate relative to the rest of the flexible substrate when the key assembly is depressed. FIG. 13B illustrates a cross-section of an example key stack. As shown in FIG. 13B, the folded perimeter feature 1312 is a U-shaped bend of the flexible substrate 1310. The shape of the folded perimeter feature 1312 allows the movable portion 1313 of the flexible substrate 1310 to move relative to the rest of the flexible substrate (e.g., up and down with respect to FIG. 13B). In various embodiments, the folded perimeter feature 1312 may have different shapes and/or forms (e.g., S-shaped, embossed, and so on).

As shown in FIGS. 13A-13B, the key stack 1300 includes a switch assembly 1330 disposed below the flexible substrate 1310. Similar to the switch assemblies described herein, the switch assembly 1330 is configured to facilitate movement of the key assembly 220 and to detect inputs in response to forces applied at a keycap 1322. In the embodiment of FIG. 13A, the switch assembly 1330 is a butterfly switch mechanism. The butterfly switch mechanism includes a key mechanism 1332 and a switch 1334. The switch assembly 1330 may further include a switch housing 1336 for performing various mechanical and/or electrical functions of the key stack 1300, such as housing and supporting the switch 1334, coupling the switch assembly to a base plate 1360 or other substrate of the electronic device, providing mounting and/or coupling features for the key mechanism 1332, and the like.

Figure 13C:
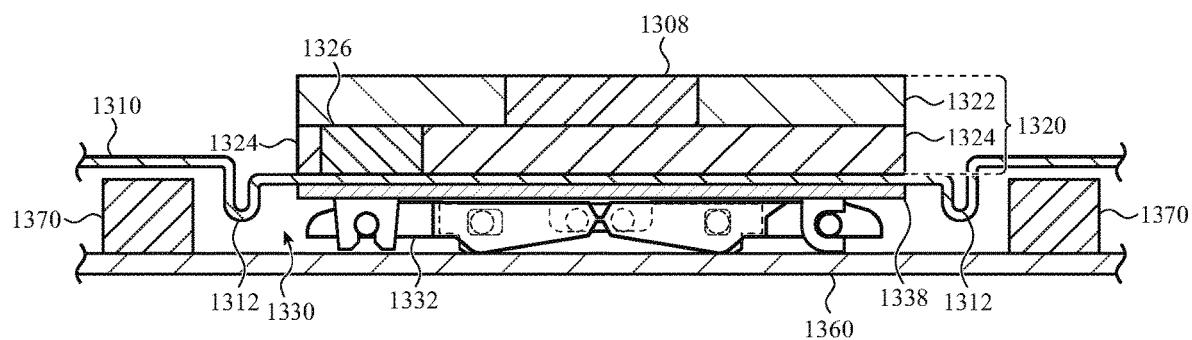
FIG. 13C is a cross-section of the example key stack of FIG. 13B in a depressed position, according to an embodiment.

FIG. 13B is a cross section of an example key stack (e.g., key stack 1300), according to an embodiment. The input member 1338 is configured to actuate the switch 1334 in response to the keycap being depressed, for example in response to the key being pressed. In particular, the input member is configured to transmit a force applied to the keycap 1322 to the switch 1334, thereby actuating the switch. This, in turn, causes an input to be registered by the electronic device. FIG. 13C illustrates the example key stack of FIG. 13B in a depressed position, according to an embodiment.

The key mechanism 1332 may generally bias the input member 1338 upward (with respect to the view of FIG. 13B), thereby keeping the input member in a default or rest position in the absence of external force. Likewise, when force is removed from the input member 1338 after the input member translates, the key mechanism 1332 returns to its default configuration as shown in FIG. 13B, thereby moving the input member from a depressed to a rest position. In some embodiments, the key assembly 1320 can include the input member 1338. The keycap 1322 and light guide 1324 can be a first portion of the key assembly 1320, and the input member 1338 can be a second portion of the key assembly 1320, wherein a first portion of the key assembly (including the keycap 1322 and light guide 1324) are positioned on a first, outer side of the flexible substrate 1310, and a second portion of the key assembly (including the input member 1338) is positioned on a second, inner side of the flexible substrate 1310. In some cases, the keycap 1322 and light guide 1324 can be a single, integral, monolithic structure. Alternatively, the keycap 1322 can be positioned on the first, outer side of the flexible substrate 1310, and the light guide 1324 and input member 1338 (or an integral, monolithic combination thereof) can be positioned on the second, inner side of the flexible substrate 1310.

The input member 1338 can be connected to the key mechanism 1332 using hooks, clamps, interlocking parts, and related devices. The input member 1338 can be attached to the underside of the flexible substrate 1310 opposite the light guide 1324 and can have an outer perimeter similar to the outer perimeter of the light guide 1324 or keycap 1322. In some embodiments, the light guide 1324 comprises a light-transmissive material such as one of the light-transmissive materials described elsewhere herein.

As depicted in FIG. 13C, the folded perimeter features 1312 allow the movable portion of the flexible substrate to move relative to the rest of the flexible substrate when the key assembly is depressed.

In the depicted example, the key mechanism 1332 is a butterfly hinge. However, this is merely one example of a key mechanism that may be used in a switch assembly 1330, and other key mechanism may be used instead of the butterfly hinge in any given key, including scissor mechanisms, hinge mechanisms, or any other mechanism that movably supports a keycap relative to a switch.

In the depicted example, the switch 1334 is a dome switch. However, this merely one example of a switch that may be used in a switch assembly 1330, and other switches may be used instead of the collapsible dome in any given key, including membrane switches, scissor switches, mechanical switches, buckling springs, optical switches, and so on.

Figure 13D:
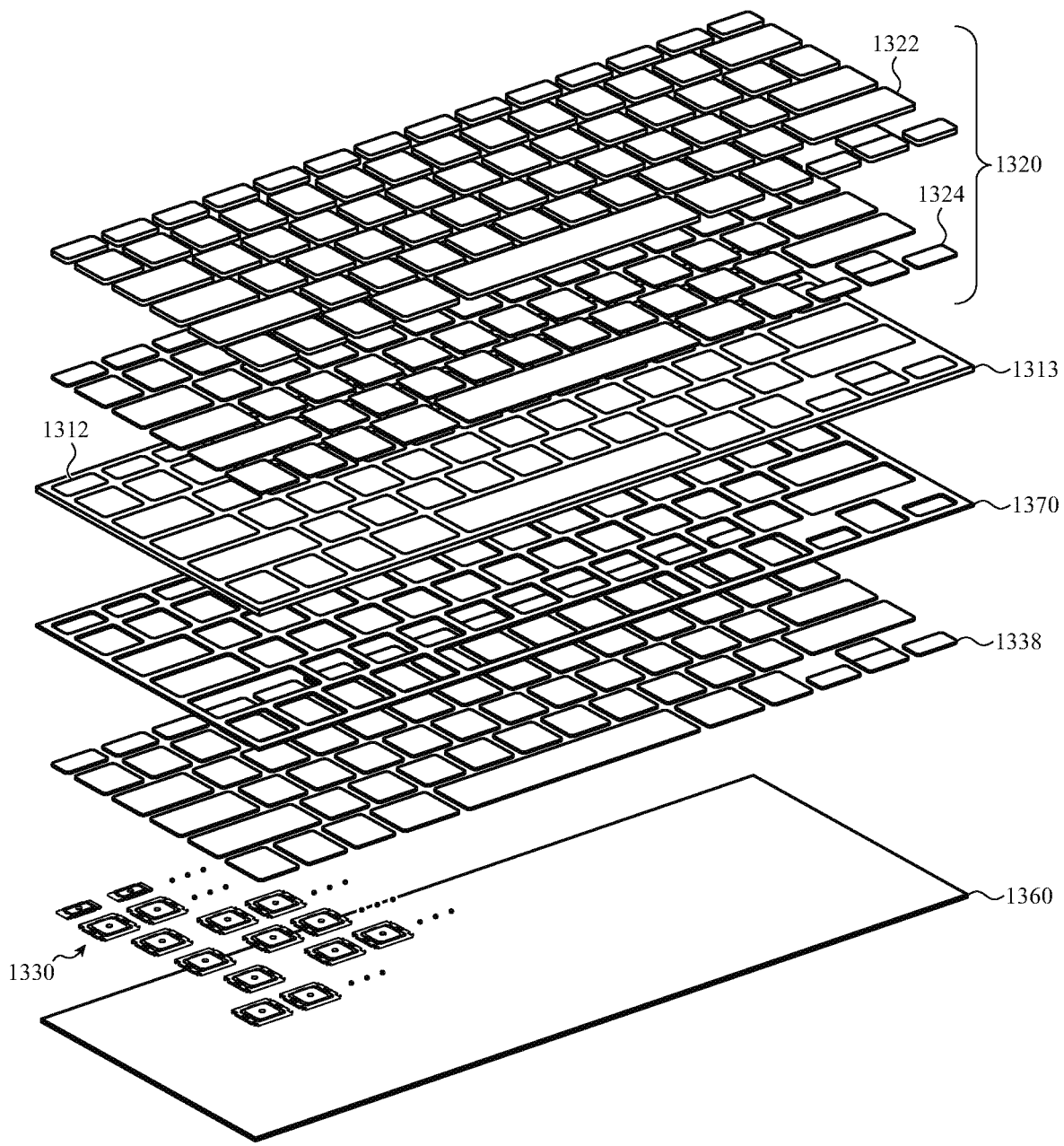
FIG. 13D depicts a schematic view of an example keyboard incorporating key stacks, according to an embodiment.

FIG. 13D depicts a schematic view of an example keyboard incorporating key stacks (e.g., key stacks 200, 700, 1300, and so on), according to an embodiment. The keyboard includes a key web 1370 that supports the key assembly 1320 and the flexible substrate 1310. In various embodiments, the key web 1370 is formed of a rigid material such as aluminum, titanium, plastic, or the like. The key web 1370 includes an opening that allows the movable portion 1313 of the flexible substrate 1310 to depress relative to the rest of the flexible substrate when the keycap is depressed.

Although many embodiments described and depicted herein reference light guides for illuminable keys of a keyboard, it should be appreciated that other implementations can take other form factors. Thus, the various embodiments described herein, as well as functionality, operation, components, and capabilities thereof may be combined with other elements as necessary, and so any physical, functional, or operational discussion of any element or feature is not intended to be limited solely to a particular embodiment to the exclusion of others.

For example, although the electronic device 100 is shown in FIGS. 1A-1B as a laptop computer, it may be appreciated that other electronic devices are contemplated. For example, the electronic device 100 can be implemented as a peripheral input device, a desktop electronic device, a handheld input device, a tablet electronic device, a cellular phone, a wearable device, and so on.

Figure 14:
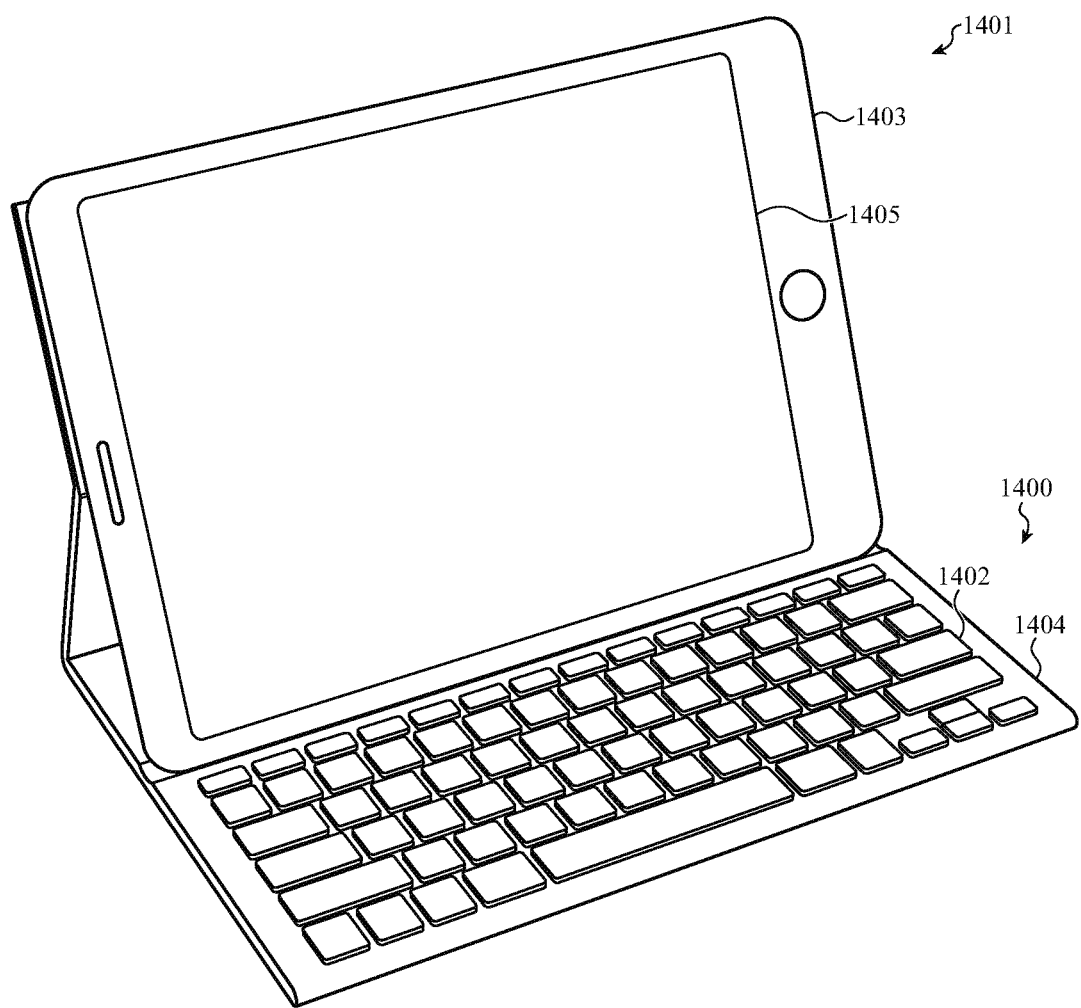
FIG. 14 shows a keyboard with illuminable keys for use with an electronic device, as described herein.

FIG. 14 shows a keyboard 1400 with illuminable keys for use with an electronic device 1401, as described herein. The electronic device 1401 is depicted as a tablet computer that includes a housing 1403 and a display 1405 (which may be a touch-sensitive display). As shown, the keyboard 1400 is a peripheral input device for the electronic device 1401, and is incorporated into a cover or case for the electronic device 1401, which may be removable or detachable from the electronic device 1401. The keyboard 1400 includes a keyboard housing 1404 and illuminable keys 1402, similar to the illuminable key 102 described herein.

In other embodiments, a keyboard such as described herein may be incorporated within a housing of an electronic device (rather than in its own separate housing), or it may be housed in a different housing or structure than that shown in FIGS. 1A and 14. For example, in some embodiments, the keyboard may be a standalone keyboard (e.g., it need not be incorporated into a cover or case of a separate electronic device).

It may be appreciated that the electronic devices (e.g., electronic devices 100 and 1401) can include one or more components that interface or interoperate, either directly or indirectly, with the illuminable keys which, for simplicity of illustration are not depicted herein. For example, the electronic device may include a processor coupled to or in communication with a memory, a power supply, one or more sensors, one or more communication interfaces, and one or more input/output devices such as a display, a speaker, a rotary input device, a microphone, an on/off button, a mute button, a biometric sensor, a camera, a force and/or touch sensitive trackpad, and so on.

In some embodiments, the communication interfaces provide electronic communications between the electronic device and an external communication network, device or platform. The communication interfaces can be implemented as wireless interfaces, Bluetooth interfaces, universal serial bus interfaces, Wi-Fi interfaces, TCP/IP interfaces, network communications interfaces, or any conventional communication interfaces. The electronic device may provide information related to externally connected or communicating devices and/or software executing on such devices, messages, video, operating commands, and so forth (and may receive any of the foregoing from an external device), in addition to communications. As noted above, for simplicity of illustration, the electronic devices herein are illustrated without many of these elements, each of which may be included, partially, optionally, or entirely, within a housing.

In some embodiments, the housing can be configured to, at least partially, surround a display. In many examples, the display may incorporate an input device configured to receive touch input, force input, and the like and/or may be configured to output information to a user. The display can be implemented with any suitable technology, including, but not limited to, a multi-touch or multi-force sensing touchscreen that uses liquid crystal display (LCD) technology, light-emitting diode (LED) technology, organic light-emitting display (OLED) technology, organic electroluminescence (OEL) technology, or another type of display technology.

The housing can form an outer surface or partial outer surface and protective case for the internal components of the electronic device. In the illustrated embodiment, the housing is formed in a substantially rectangular shape, although this configuration is not required. The housing can be formed of one or more components that are operably connected, such as a front piece and a back piece or a top portion and a bottom portion. Alternatively, the housing can be formed of a single piece (e.g., uniform body or unibody).

Various embodiments described herein can be incorporated with other systems or apparatuses and may not, in all cases, be directly associated with an input device configured for use with an electronic device such as depicted herein. For example, a light guide as described herein can be incorporated into an independent electronic switch such as a button (e.g., light switch, automotive button, doorbell, and so on). In other examples, a light guide as described herein can be incorporated into a different portion of an electronic device, such as a display element of an electronic device. In such an example, a light guide incorporating prismatic or scalloped sidewalls can be used as a backlight diffuser within a display stackup.

Additionally, it may be appreciated, that for illuminable key embodiments, the various structures and mechanisms described herein are not intended to limit the disclosure to a particular favored or required geometry or form factor. For example, an illuminable key can include a butterfly mechanism, a scissor mechanism, or any other suitable type of key mechanism. An illuminable key can include a keycap that is formed to have a substantially flat top surface or, in other embodiments, to have a partially curved top surface. An electronic switch associated with the illuminable key can be implemented as a single throw switch, a multi-throw switch, a capacitive switch, and so on. A tactile feedback structure associated with the illuminable key can be implemented as an elastomeric dome, a spring, an elastomer deposit, a metal dome, or any combination thereof.

Furthermore, one may appreciate that although many embodiments are disclosed above, that the operations and steps presented with respect to methods and techniques described herein are meant as exemplary and accordingly are not exhaustive. One may further appreciate that an alternate step order or fewer or additional steps may be implemented in particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An electronic device comprising:
   a keyboard comprising:
      a flexible substrate having a conductive trace;
      a light emitting element on the flexible substrate and electrically coupled to the conductive trace; and
      a set of keys, each key comprising:
         a keycap positioned over the flexible substrate and having an illuminable portion defining a symbol;
         a light guide positioned between the keycap and the flexible substrate and configured to optically couple light from the light emitting element to the illuminable portion of the keycap; and
         a switch assembly positioned below the flexible substrate.

2. The electronic device of claim 1, wherein:
   the flexible substrate is a fabric sheet; and
   the conductive trace includes one or more conductive threads integrated into the fabric sheet.

3. The electronic device of claim 1, wherein the light emitting element is positioned above the flexible substrate and is configured to transmit light into a sidewall of the light guide.

4. The electronic device of claim 1, wherein the light guide defines light extraction features configured to direct the light to a lower surface of the keycap.

5. The electronic device of claim 4, wherein a spacing of the light extraction features varies in accordance with a distance from the light emitting element.

6. The electronic device of claim 4, wherein at least a portion of the light extraction features are positioned along a bottom surface of the light guide and the portion of the light extraction features are configured to reflect light toward the keycap.

7. The electronic device of claim 4, wherein at least a portion of the light extraction features are positioned along a top surface of the light guide and the portion of the light extraction features are configured to refract light toward the keycap.

8. The electronic device of claim 1, wherein the light guide is configured to produce a substantially uniform distribution of light along a lower surface of the keycap.

9. The electronic device of claim 1, wherein:
the flexible substrate includes a folded perimeter feature; and
the folded perimeter feature is configured to facilitate movement of a localized region of the flexible substrate when the keycap is depressed.

10. A keyboard comprising:
a flexible substrate;
a set of keycaps positioned over the flexible substrate, each keycap of the set of keycaps comprising a translucent portion and configured to depress in response to a press;
a set of light guides, each light guide of the set of light guides positioned above the flexible substrate and below a respective keycap of the set of keycaps;
a set of light emitting elements, each light emitting element of the set of light emitting elements optically coupled to a respective light guide of the set of light guides;
a set of switch assemblies positioned below the flexible substrate, each switch assembly of the set of switch assemblies comprising:
a key mechanism configured to upwardly bias a corresponding keycap of the set of keycaps; and
a switch configured to actuate in response to the corresponding keycap being depressed; wherein:
a movable portion of the flexible substrate associated with the corresponding keycap is configured to move in response to the keycap being depressed.

11. The keyboard of claim 10, wherein:
the translucent portion of the keycap is a symbol defining a glyph;
the light guide comprises at least one light extraction feature configured to direct light to the symbol; and
the light emitting element is a light-emitting diode positioned in a corner of the light guide.

12. The keyboard of claim 10, wherein the flexible substrate includes a folded perimeter feature defining the movable portion of the flexible substrate.

13. The keyboard of claim 10, wherein the light emitting element is positioned below the flexible substrate.

14. The keyboard of claim 10, wherein:
the light emitting element is disposed on the flexible substrate;
the flexible substrate comprises a conductive trace operably coupled to a power source; and
the light emitting element is electrically coupled to the power source via the conductive trace.

15. The keyboard of claim 10, wherein:
the light emitting element is a first light emitting element;
the keyboard further comprises a second light emitting element optically coupled to the light guide; and
the first and second light emitting elements are positioned at different corners of the light guide.

16. The keyboard of claim 10, wherein:
the light emitting element is positioned beneath the flexible substrate; and
the keyboard further comprises an optical interface configured to transmit light from the light emitting element to the light guide.

17. The keyboard of claim 10, further comprising a set of input members connected to the key mechanisms of the set of switch assemblies, the set of input members being connected to the flexible substrate opposite the set of light guides.

* * * * *